United States Patent
Doan

(10) Patent No.: US 6,893,333 B2
(45) Date of Patent: May 17, 2005

(54) CHEMICAL MECHANICAL POLISHING SLURRY

(75) Inventor: Trung Tri Doan, Boise, ID (US)

(73) Assignee: Micron Technology, Inc., Boise, ID (US)

(*) Notice: Subject to any disclaimer, the term of this patent is extended or adjusted under 35 U.S.C. 154(b) by 133 days.

(21) Appl. No.: 10/387,178

(22) Filed: Mar. 11, 2003

(65) Prior Publication Data

US 2003/0166379 A1 Sep. 4, 2003

Related U.S. Application Data

(62) Division of application No. 09/717,477, filed on Nov. 20, 2000, which is a division of application No. 09/389,536, filed on Sep. 2, 1999, now Pat. No. 6,254,928.

(51) Int. Cl.⁷ .............................. B24B 31/02; B24D 3/02
(52) U.S. Cl. ............................ 451/330; 451/36; 451/41; 51/297; 51/309
(58) Field of Search ......................... 51/297, 307, 308, 51/309; 451/36, 41, 59, 63, 330

(56) References Cited

U.S. PATENT DOCUMENTS

| | | | |
|---|---|---|---|
| 3,453,782 A | | 7/1969 | Hagelüken et al. |
| 3,650,714 A | * | 3/1972 | Farkas ..................... 51/295 |
| 4,314,525 A | | 2/1982 | Hsu et al. ................ 118/716 |
| 4,505,720 A | | 3/1985 | Gabor et al. |
| 4,585,671 A | | 4/1986 | Kitagawa et al. ........ 427/54.1 |
| 4,642,227 A | | 2/1987 | Flagan et al. ............ 423/349 |
| 4,883,521 A | | 11/1989 | Shimizu et al. ............ 65/17 |
| 4,994,107 A | | 2/1991 | Flagan et al. |
| 5,405,648 A | * | 4/1995 | Hermann ............... 427/213.31 |
| 5,514,350 A | | 5/1996 | Kear et al. |
| 5,525,191 A | * | 6/1996 | Maniar et al. ............ 438/693 |
| 5,695,617 A | | 12/1997 | Graiver et al. |
| 5,814,152 A | | 9/1998 | Thaler |
| 5,876,490 A | | 3/1999 | Ronay |
| 5,876,683 A | | 3/1999 | Glumac et al. |
| 6,103,393 A | | 8/2000 | Kodas et al. |
| 6,254,928 B1 | | 7/2001 | Doan ..................... 427/212 |
| 6,270,395 B1 | | 8/2001 | Towery et al. |
| 6,464,740 B1 | | 10/2002 | Towery et al. |
| 2002/0003225 A1 | | 1/2002 | Hampden-Smith et al. |
| 2002/0020833 A1 | * | 2/2002 | Zhang et al. ............. 252/500 |

OTHER PUBLICATIONS

Luce et al., *Laser Synthesis of Nanometric Silica Powders*, 4 NanoStructured Materials, No. 4, pp. 403–408 (Elsevier Science Ltd. 1994).

Strutt et al., *Synthesis of Polymerized Preceramic Nanoparticle Powders by Laser Irradiation of Metalorganic Precursors*, 1 NanoStructured Materials, pp. 21–25 (Pergamon Press 1992).

* cited by examiner

*Primary Examiner*—Timothy V. Eley
(74) *Attorney, Agent, or Firm*—Wells St. John P.S.

(57) ABSTRACT

A chemical mechanical polishing slurry includes liquid and abrasive solid components, with at least some of the abrasive solid component comprising individually non-homogeneous abrasive particles. In one implementation, the non-homogeneous abrasive particles comprise an innermost portion and an outermost portion, with the innermost and outermost portions comprising different materials. In one implementation, the material of the outermost portion is harder than the material of the innermost portion. In one implementation, the material of the outermost portion comprises TiN and the material of the innermost portion comprises $SiO_2$. In one implementation, the material of the outermost portion comprises WN and the material of the innermost portion comprises TiN. In one implementation, the material of the outermost portion is softer than the material of the innermost portion.

8 Claims, 2 Drawing Sheets

CHEMICAL MECHANICAL POLISHING SLURRY

RELATED PATENT DATA

This patent resulted from a divisional application of U.S. patent application Ser. No. 09/717,477, filed Nov. 20, 2000, entitled "Chemical Mechanical Polishing Process", naming Trung Tri Doan as inventor, the disclosure of which is incorporated by reference; which resulted from a divisional application of U.S. patent application Ser. No. 09/389,536, filed Sep. 2, 1999, entitled "Laser Pyrolysis Particle Forming Method and Particle Forming Method", naming Trung Tri Doan as inventor, now U.S. Pat. No. 6,254,928 B1, the disclosure of which is incorporated by reference.

TECHNICAL FIELD

This invention relates to particle forming methods, laser pyrolysis particle forming methods, to chemical mechanical polishing slurries, and to chemical mechanical polishing processes.

BACKGROUND OF THE INVENTION

Chemical mechanical polishing is one technique utilized to process the outer surface of various layers formed over a semiconductor wafer. One principal use of chemical mechanical polishing is to render an outer wafer surface of a layer or layers to be more planar than existed prior to starting the polishing. Only some or all of the outermost layer being polished might be removed during such a process.

In chemical mechanical polishing, both the wafer and the pad which polishes the wafer are typically caused to rotate, typically in opposite directions during the polishing action. A liquid slurry is received intermediate the wafer and the polishing pad. The slurry comprises a liquid solution, typically basic, and a solid abrasive grit material, typically constituting particles of a consistent size (i.e., within 5 nanometers of a typical selected size from around 25 to 100 nanometers in diameter). The action of the liquid solution and abrasive grit within the slurry intermediate the wafer pad and wafer imparts removal of outer wafer layers utilizing both chemical and mechanical actions.

One particular goal in the development of chemical mechanical polishing slurries is the provision of particles of substantially uniform size. As identified above, the typical individual particle size of chemical mechanical polishing slurries is less than about 100 nanometers. Manufactured materials of this fine size are commonly referred to as nanomaterials or nanoparticles. Such materials find use in polishing processes and materials other than chemical mechanical polishing, for example in batteries and in chemical reaction catalysts. Such materials have historically been fabricated using combustion flame synthesis methods, such as for example described in U.S. Pat. No. 5,876,683 to Glumac et al. More recently, laser synthesis of nanoparticles is also gaining interest, such as described in U.S. Pat. No. 5,695,617 to Graiver et al., *Laser Synthesis of Nanometric Silica Powders*, by M. Luce et al., and *Synthesis of Polymerized Preceramic Nanoparticle Powders by Laser Irradiation of Metalorganic Precursors*, by P. R. Strutt et al., which are hereby incorporated by reference.

It would be desirable to improve upon the laser synthesis methods, and to produce improved chemical mechanical polishing slurries independent of the method fabrication.

SUMMARY

The invention comprises particle forming methods including laser pyrolysis particle forming methods, chemical mechanical polishing slurries, and chemical mechanical polishing processes. In but one preferred implementation, a laser pyrolysis particle forming method includes feeding a first set of precursors to a first laser application zone. Laser energy is applied to the first set of precursors in the first laser application zone effective to react and form solid particles from the first set of precursors. Application of any effective laser energy to the solid particles is ceased and the solid particles and a second set of precursors are fed to a second laser application zone. Laser energy is applied to the second set of precursors in the second laser application zone effective to react and form solid material about the solid particles from the second set of precursors.

In one implementation, a particle forming method includes feeding a first set of precursors to a first energy application zone. Energy is applied to the first set of precursors in the first energy application zone effective to react and form solid particles from the first set of precursors. Application of any effective energy to the solid particles is ceased and the solid particles and a second set of precursors are fed to a second energy application zone. Energy is applied to the second set of precursors in the second energy application zone effective to react and form solid material about the solid particles from the second set of precursors. Preferably, at least one of the first and second applied energies comprises laser energy.

In one implementation, a chemical mechanical polishing slurry comprises liquid and abrasive solid components. At least some of the abrasive solid component comprises individually non-homogeneous abrasive particles.

In one implementation, a chemical mechanical polishing process includes rotating at least one of a semiconductor substrate and polishing pad relative to the other. A chemical mechanical polishing slurry is provided intermediate the substrate and pad, and the substrate is polished with the slurry and pad during the rotating. The chemical mechanical polishing slurry comprises liquid and abrasive solid components. At least some of the abrasive solid component comprises individually non-homogeneous abrasive particles.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

Figure 1:
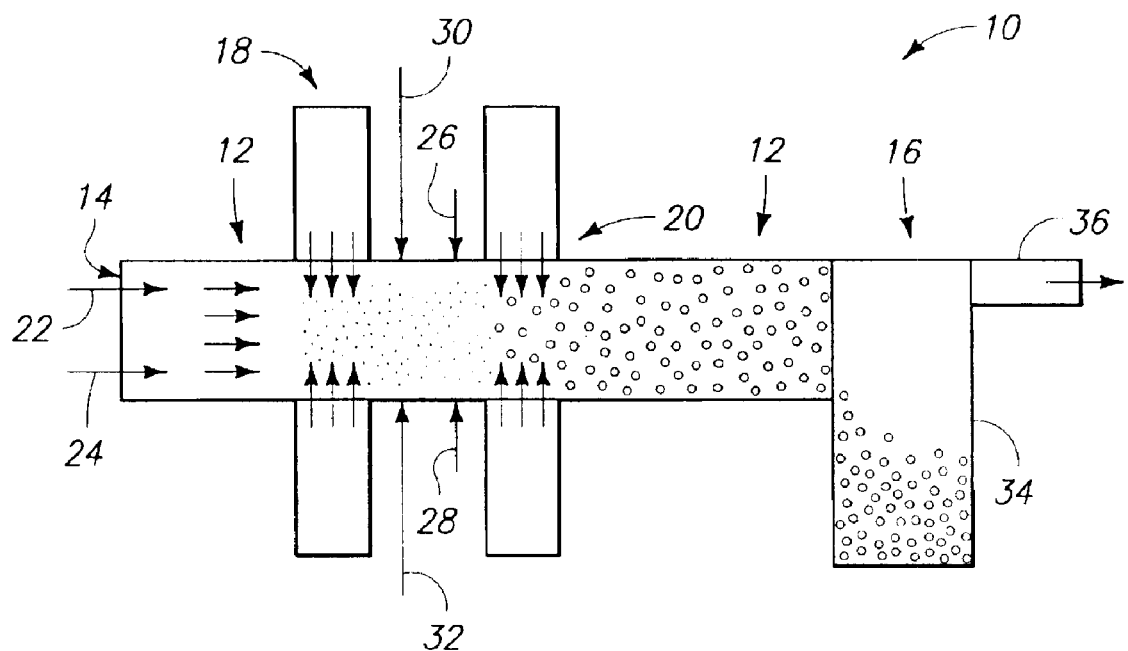
FIG. 1 is a diagrammatic depiction of a laser pyrolysis particle forming method in accordance with an aspect of the invention.

This disclosure of the invention is submitted in furtherance of the constitutional purposes of the U.S. Patent Laws "to promote the progress of science and useful arts" (Article 1, Section 8).

A laser pyrolysis particle forming method is indicated generally 14 with reference numeral 10. Such comprises a reaction flow path 12 having a beginning end 14 and a product collection end 16. Reaction flow path 12 comprises at least first and second spaced laser application zones 18 and 20, respectively. A pair of first precursor inlets 22 and 24 are provided to reaction flow path 12 proximate beginning end 14 in advance of first laser application zone 12. A pair of second precursor inlets 26 and 28 are provided to reaction flow path 12 between first laser application zone 18 and second laser application zone 20. A pair of inert gas inlets 30 and 32 are also provided intermediate first laser application zone 18 and second laser application zone 20. Such are preferably provided for injection of purging gas at this point in the flow path, as will be described below. More or fewer precursor or inert inlets could of course be provided.

Reaction flow path end 16 includes a suitable trap 34 for collecting the formed particles. Unreacted precursor material, purge and/or carrier gases are expelled via an exhaust 36.

At least one precursor is fed through one of first inlets 22 and 24 to reaction flow path 12 in advance of first laser application zone 18. The precursor or precursors are preferably provided as a gas. In a particular example, where for example $SiO_2$ particles are to be formed, example reactive flow gases for lines 22 and 24 include a silane if such as dichlorosilane, and $O_2$, respectively. An example flow rate range for the dichlorosilane is from about 100 sccm to about 10 slm, with an example flow rate for the $O_2$ also being from about 100 sccm to about 10 slm. Temperature and pressure are preferably maintained within the reaction flow path outside of first and second spaced laser application zones 18 and 20 such that reaction of gases therein does not occur.

The one or more precursors fed from precursor inlets 22 and 24 are fed along reaction flow path 12 to first laser application zone 18. The dichlorosilane and oxygen in this example comprise a first set of precursors which is fed to first laser application zone 18. Laser energy is applied in first laser application zone 18 effective to react and form solid particles from the at least one precursor fed from at least one of first inlets 22 and 24. An example preferred pressure is 200 mTorr, with preferred temperature being ambient and not controlled. The particles formed are exemplified in FIG. 1 by the illustrated specks or dots materializing in laser application zone 18. An example laser is the commercial PRC-Oerlikon 1500W fast-axial-flow $CO_2$ laser, such as described in the Luce et al. article referred to in the Background section of this document. Other lasers, including excimer lasers, are also of course utilizable, with KrF, ArF and Xe lasers being but only three additional examples. Any suitable power can be chosen effective to provide suitable energy to cause a reaction and produce particles, and could be optimized by the artisan depending upon gas flow rate, 11 desired particle size, etc. The material of the particles formed utilizing the example dichlorosilane and $O_2$ feed gases will predominately comprise $SiO_2$.

Such provides but one example process of first applying laser energy to a first set of precursors in a first laser application zone effective to react and form solid particles from the first set of precursors. Alternate processing is of course contemplated. For example, and by way of example only, precursors could be injected as liquid, and/or directly into the laser application zone as opposed to in advance thereof as depicted and described relative to the most preferred embodiment.

The formed solid particles and any unreacted gas are fed from first laser application zone 18 along reaction flow path 12 to between the first and second spaced laser application zones 18 and 20, respectively. Such provides but one example of ceasing application of any reaction effective laser energy to the solid particles after their initial formation in first laser application zone 18. At least one precursor is fed through at least one of second precursor inlets 26 and 28 into reaction flow path 12 between first and second laser application zones 18 and 20 having the solid particles flowing therein.

The precursor or precursors fed from at least one of second inlets 26 and 28 and the solid particles are fed along reaction flow path 12 to second laser application zone 20. Such provides but one example of feeding the solid particles and a second set of precursors 11 to a second laser application zone. Laser energy is applied in second laser application zone 20 effective to react and form solid material about the solid particles from the at least one precursor fed from at least one of second inlets 26 and 28. Such is shown in FIG. 1 by the enlarged or grown particles appearing within second laser application zone 20.

The precursors provided from one or both of first inlets 22 and 24 can be the same as that provided from one or both of second precursor inlets 26 and 28, effectively forming substantially homogeneous solid particles at the conclusion of applying laser energy in second laser application zone 20. In effect in this example embodiment, the first formed particles in first laser application zone 18 are subsequently coated in a separate laser application zone 20 with the same material, effectively layering and growing particles which are substantially individually homogeneous throughout. Application of at least two and perhaps more laser pyrolysis steps for forming the particles might result in more uniform size and shaped particles than might otherwise occur in a single laser application process.

Alternately by way of example, the first and second sets of precursors can be provided to be different, with the second depicted laser energy application forming a solid material coating over the solid particles which is different from material of the solid particles formed in first laser application zone 18. Such might be utilized to provide optimized solid particles having different property outer and inner materials, for example making the outer coating material or materials harder or softer than the inner or initial material of the solid particles formed in first laser application zone 18.

By way of example only, and continuing with the above example where $SiO_2$ particles are formed in first laser application zone 18, the subsequently formed solid material coating the particles as formed in second laser application zone 20 might comprise an elemental metal, such as elemental tungsten. For example, one or more precursors could be fed into reaction flow path 12 from multiple inlets 26 and 28 to provide suitable reactive precursor materials, preferably in the form of gases, for feeding to second laser application zone 20. For example, a mixture of $WF_6$ and an effective amount of $H_2$ could be fed as a mixture from each of inlets 26 and 28, which would react in second laser application zone 20 to coat the initially formed $SiO_2$ particles with elemental tungsten.

Where the first and second sets of precursors are different, it might be desirable to provide an inert purge gas, such as $N_2$ or Ar, from inlets 30 and 32 between first and second laser application zones 18 and 20 in advance of precursor inlets 26 and 28. Such purging might be desired to effectively dilute any unreacted remaining gases which have flowed through first laser application zone 18 to prevent reaction of the same in second laser application zone 20 where one or more discrete different material coatings are desired on the outside of the initially formed particles. Such gases flowing from first laser application zone 18 and any purged gases injected by inlets 30 and 32 might be exhausted (not shown) from reaction flow path 12 in advance of subsequent precursor injection at at least one of 26 and 28, or alternately flow in a diluted manner through second laser application zone 20.

The first and second sets of precursors might or might not share at least one common precursor. The above described example is one where no precursor material is common to the first and second sets. Consider alternately by way of example only a process wherein it is desired to form inner and outer layers of a particle which comprise different nitrides. For example, consider forming the inner layer to comprise TiN, and forming the outer layer to comprise a harder WN material. $NH_3$ could be utilized as one of the precursor gases for supplying the nitrogen component of the formed nitrides in both the first and second sets of precursors. In one example, an abundance of $NH_3$ could be fed to reaction flow path 12 in advance of first laser application zone 18. An example additional first precursor gas flowing from one or both of first inlets 22 and 24 would be $TiCl_4$. The $TiCl_4$ and $NH_3$ would desirably react to form TiN particles in first laser application zone 18. Unreacted $NH_3$ and reaction byproducts would flow from first laser application zone 18, and could be combined with $WF_6$ flowing out of one or both of second inlets 26 and 28. The $WF_6$ and $NH_3$ would desirably react within second laser application zone 20 to form and outer coating of WN over the initially formed TiN particles. Additional $NH_3$ might be added to reaction flow path 12 intermediate first laser application zone 18 and second laser application zone 20 through one or both of inlets 26 and 28.

More than two laser application zones or laser applications might also be utilized. Regardless, the processes most preferably are utilized 17 to produce nanomaterials, whereby the ultimately formed solid particles have a maximum diameter of no greater than 1 micron, and more preferable no greater than 100 nanometers.

Figure 2:
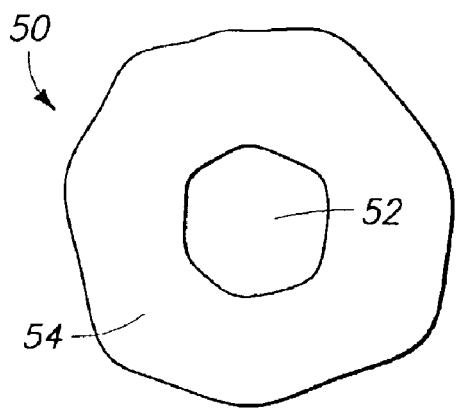
FIG. 2 is a diagrammatic sectional view of a chemical mechanical polishing slurry abrasive particle.

FIG. 2 depicts an individually formed non-homogeneous particle 50. Such comprises an inner exemplary portion 52 formed within first laser application zone 18, and an outer coating 54 formed in second laser application zone 20.

The resultant formed particles are collected in trap 34 (FIG. 1), with remaining precursor inert or carrier gases being exhausted via line 36 FIG. 1.

Figure 3:
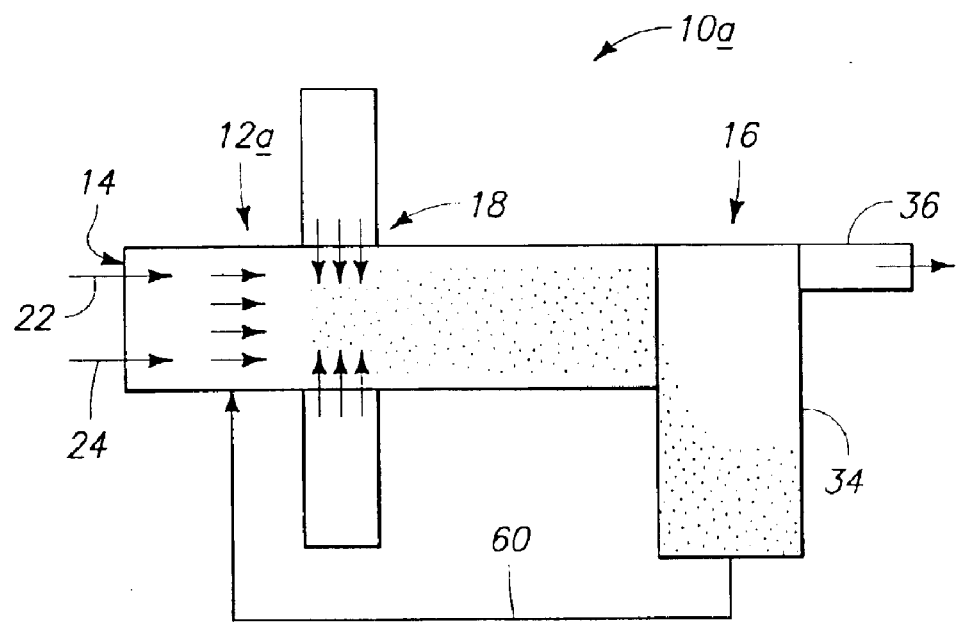
FIG. 3 is a diagrammatic representation of an alternate laser pyrolysis particle forming method in accordance with an aspect of the invention.

The above described processing depicted the first and second laser application zones as being different and spaced from one another along a reaction flow path. Alternate considered processing in accordance with the invention is shown in FIG. 3, whereby the first and second laser application zones comprise the same zones in different first and second applications of laser energy to the same or different precursors. Like numerals from the first described embodiment are utilized where appropriate, with differences being indicated with the suffix "a", or with different numerals.

Method 10a in FIG. 3 differs from that depicted in FIG. 1 by provision of a single laser application zone 18, and provision of a recycle stream 60 from trap 34 back to immediately in advance of laser application zone 18. In a preferred process in accordance with the FIG. 3 methodology, particles would initially be formed and collected in trap 34. Thereafter, the particles would be flowed back to reaction flow path 12a in advance of laser application zone 18, preferably in one or more discrete single batches for uniformity in size control, and combined with the same or different precursors for subsequent coating thereof. Further alternately and less preferred, pulsed laser application might occur in a single or multiple laser application zone(s) relative to one or more precursor gases to sequentially form multiple layered or coated particles.

Also contemplated in accordance with aspects of the invention is application of energy other than laser energy to effect some or all of the particle formation. For example, one or both of energy application zones 18 and 20 might comprise energy application sources other than laser. By way of example only, such might include a combustion flame, a plasma flame, photosynthesis such as UV light application, and other heat energy such as passing the precursors/forming particles through a pass-through furnace. Further, energy application zones 18 and 20 might comprise the same or different energy types.

The above described produced solid particles are preferably utilized in forming a chemical mechanical polishing slurry at least a portion of which contains such particles as the solid abrasive material within the slurry. Thereby, a preferred chemical mechanical polishing slurry in accordance with the invention comprises liquid and abrasive solid components. At least some of the abrasive solid components comprise individually non-homogeneous abrasive particles produced by the above described or prior art or yet to be developed methods. Such particles might be characterized by two distinct material layers or more layers. Preferably, one of the two layers will envelop the other.

Figure 4:
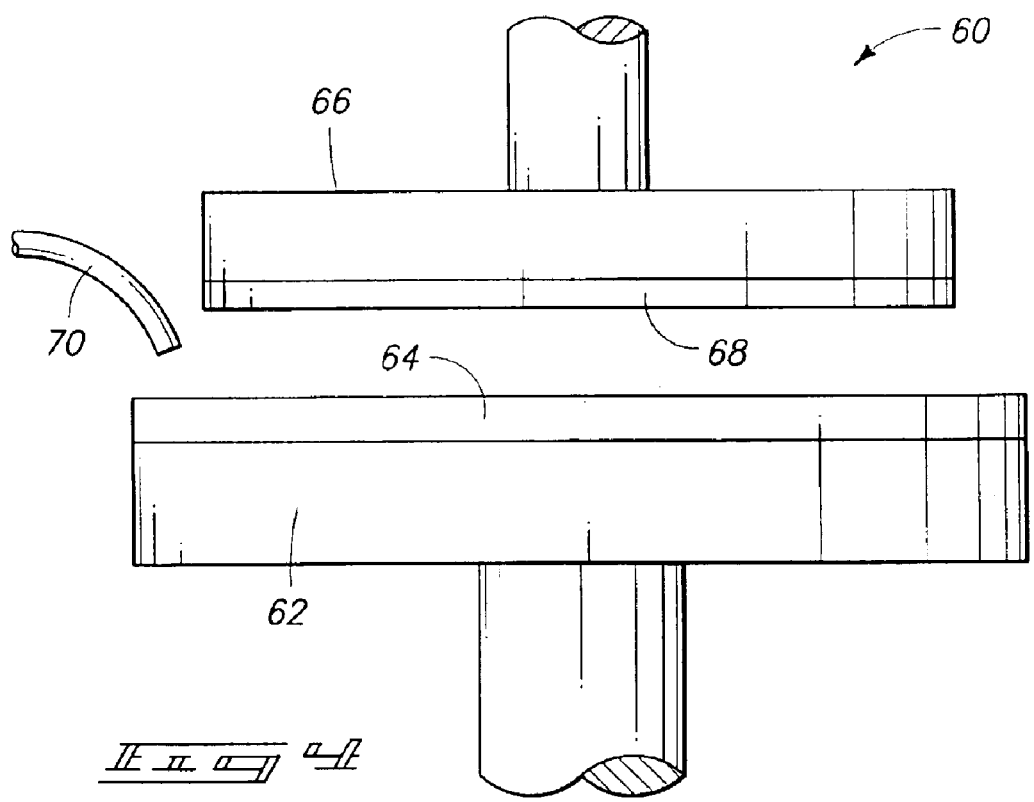
FIG. 4 is a diagrammatic view of an exemplary system used in a chemical mechanical polishing process in accordance with an aspect of the invention.

Slurries in accordance with the invention can be utilized in chemical mechanical polishing processes in accordance with another aspect of the invention, and as generally described with reference to FIG. 4. An exemplary system shown in diagrammatic or schematic form for conducting a chemical mechanical polishing method in accordance with the invention is indicated generally with reference numeral 60. Such comprises a polishing table or platen 62 having a polishing pad 64 received thereatop. A wafer carrier 66 is juxtaposed in opposing relation relative to polishing pad 64. A workpiece 68, typically in the form of a semiconductor wafer, is received by wafer carrier 66. A slurry injection port 70 is positioned to emit fluid onto pad 64 to be received between pad 64 and wafer 68 during polishing. Wafer carrier 66 and polishing table 62 are typically mounted for independent controllable rotation relative to one another. One or more wafer carrier head assemblies might be utilized for a single polishing table, and be mounted for translational movement as well relative to table 62. The above describes but one very diagrammatic exemplary depiction of a chemical mechanical polishing system within which a method of the invention might be utilized.

In accordance with this aspect of a chemical mechanical polishing process in accordance with the invention, at least one of a semiconductor substrate and polishing pad are rotated relative to the other. A chemical mechanical polishing slurry is provided intermediate the substrate and pad, and the substrate is polished with the slurry and pad during the rotating. The chemical mechanical polishing slurry comprises liquid and abrasive solid components. At least some of the abrasive solid component comprises individually non-homogeneous abrasive particles, such as for example described above and producible in accordance with the inventive and other processes.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A chemical mechanical polishing slurry comprising liquid and abrasive solid components, at least some of the abrasive solid component comprising individually non-homogeneous abrasive particles characterized by more than two distinct material layers, an outermost portion of the more than two distinct material layers comprising an elemental metal.

2. The chemical mechanical polishing slurry of claim 1 wherein the non-homogeneous abrasive particles comprise an innermost portion, the innermost and outermost portions comprising different materials.

3. The chemical mechanical polishing slurry of claim 2 wherein the material of the outermost portion is harder than the material of the innermost portion.

4. The chemical mechanical polishing slurry of claim 2 wherein the material of the outermost portion is softer than the material of the innermost portion.

5. The chemical mechanical polishing slurry of claim 1 wherein the material of the outermost portion comprises W and the material of the innermost portion comprises $SiO_2$.

6. The chemical mechanical polishing slurry of claim 1 wherein the material of the outermost portion comprises W and the material of the innermost portion comprises TiN.

7. The chemical mechanical polishing slurry of claim 1 wherein the abrasive solid components have a maximum diameter of no greater than 100 nanometers.

8. The chemical mechanical polishing slurry of claim 1 wherein the abrasive solid components have a maximum diameter of no greater than 1 micron.

* * * * *

UNITED STATES PATENT AND TRADEMARK OFFICE
CERTIFICATE OF CORRECTION

PATENT NO. : 6,893,333 B2  
APPLICATION NO. : 10/378187  
DATED : May 17, 2005  
INVENTOR(S) : Doan Page 1 of 1

It is certified that error appears in the above-identified patent and that said Letters Patent is hereby corrected as shown below:

Column 2,  
Line 67, delete "14" after "generally".

Column 3,  
Line 24, delete "if" after "silane".  
Line 52, delete "11" after "rate".

Column 4,  
Line 14, delete "11" after "precursors".

Column 5,  
Line 6, delete "at" after "at".  
Line 30, delete "and" after "form" and insert -- an --.  
Line 37, delete "17" after "utilized".

Signed and Sealed this

Twenty-seventh Day of June, 2006

JON W. DUDAS  
*Director of the United States Patent and Trademark Office*

UNITED STATES PATENT AND TRADEMARK OFFICE
CERTIFICATE OF CORRECTION

PATENT NO. : 6,893,333 B2  
APPLICATION NO. : 10/387178  
DATED : May 17, 2005  
INVENTOR(S) : Doan Page 1 of 1

It is certified that error appears in the above-identified patent and that said Letters Patent is hereby corrected as shown below:

<u>Column 2,</u>
Line 67, delete "14" after "generally".

<u>Column 3,</u>
Line 24, delete "if" after "silane".
Line 52, delete "11" after "rate".

<u>Column 4,</u>
Line 14, delete "11" after "precursors".

<u>Column 5,</u>
Line 6, delete "at" after "at".
Line 30, delete "and" after "form" and insert -- an --.
Line 37, delete "17" after "utilized".

This certificate supersedes the Certificate of Correction issued June 27, 2006.

Signed and Sealed this

Twelfth Day of May, 2009

JOHN DOLL  
*Acting Director of the United States Patent and Trademark Office*